Feb. 28, 1956 W. C. HUEBNER 2,736,229
APPARATUS FOR COLOR SEPARATION
Original Filed July 18, 1947 6 Sheets-Sheet 1

INVENTOR.
William C. Huebner
BY Hudson, Doughton,
Williams, David & Hoffmann
ATTORNEYS

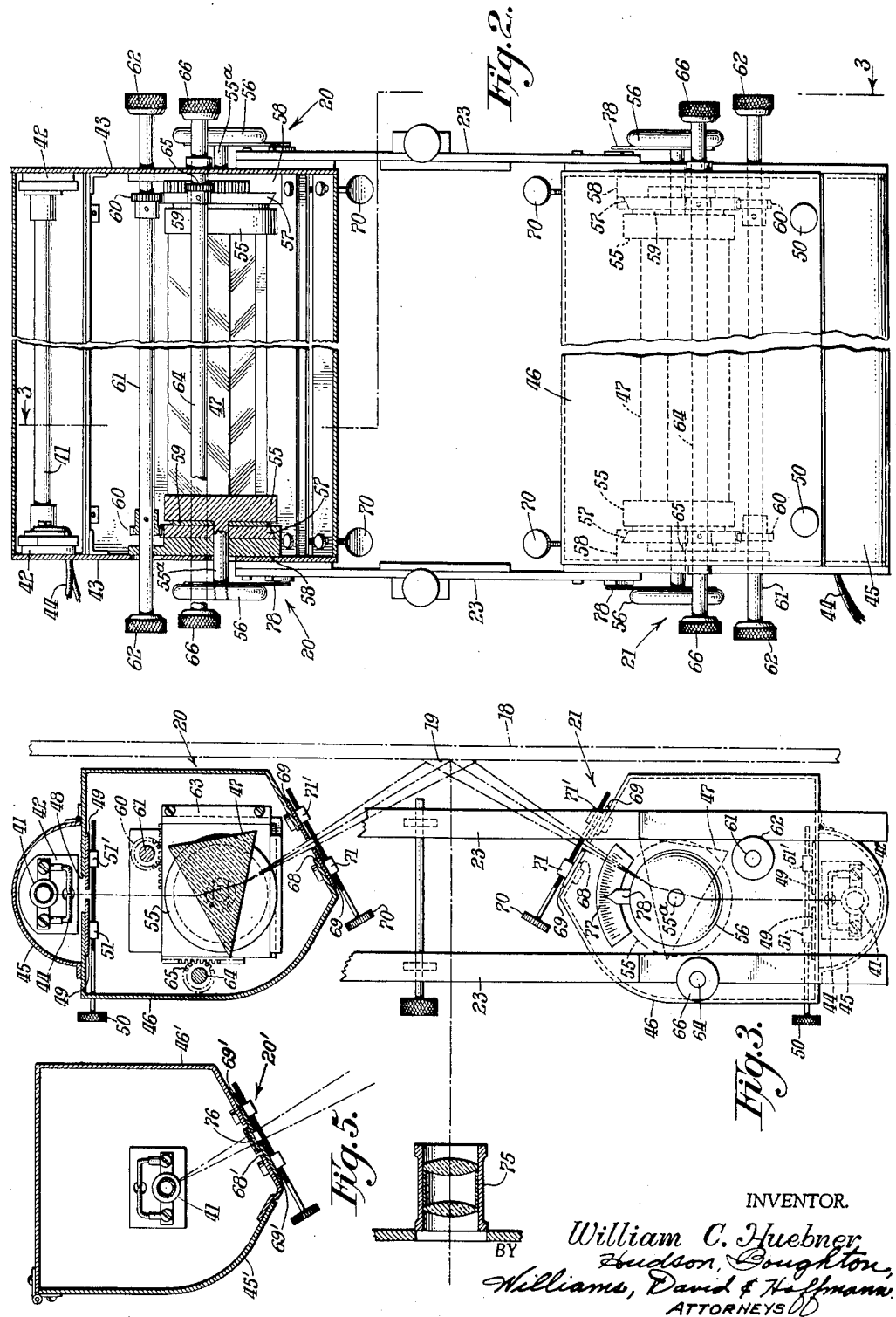

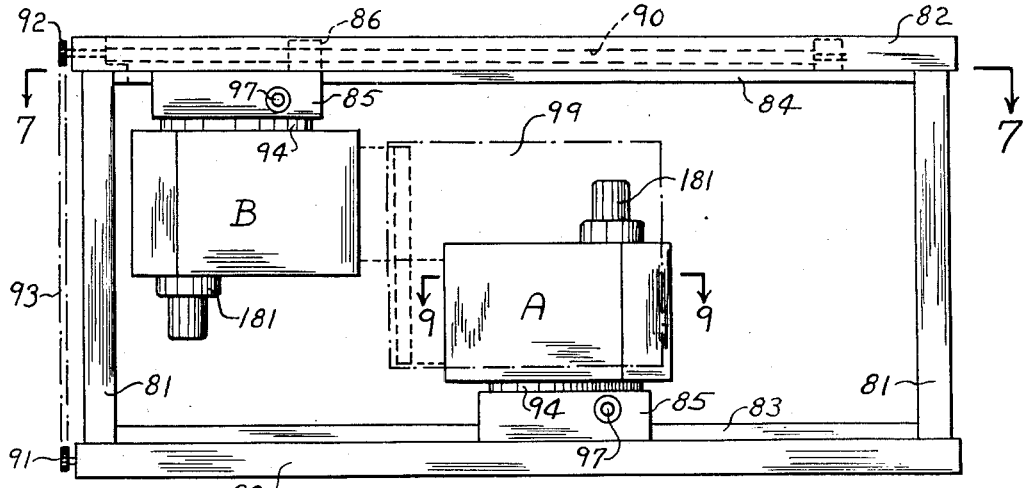
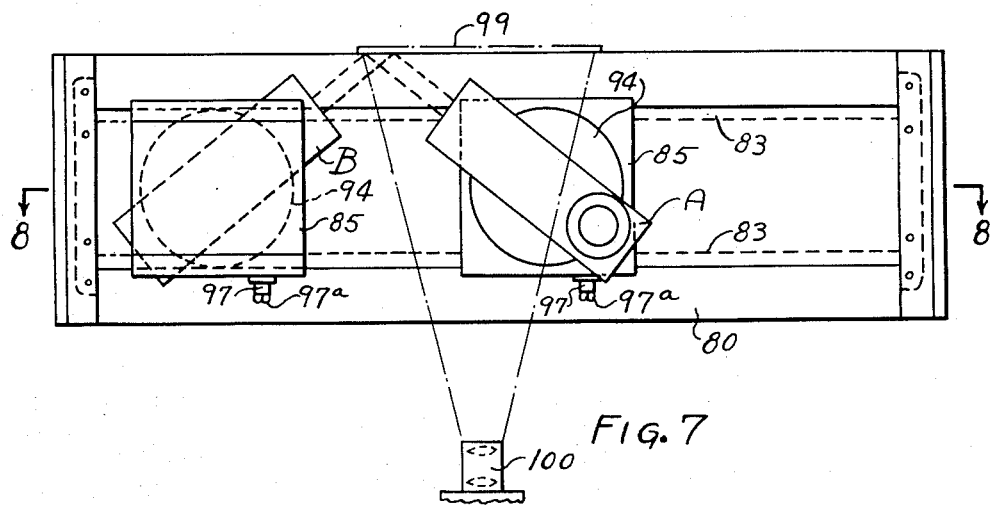
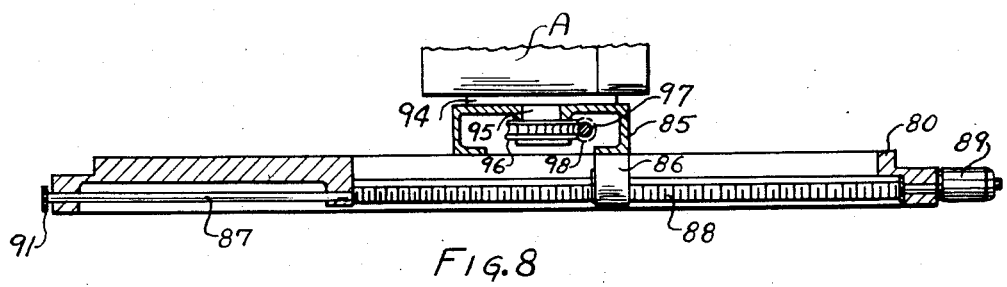

Feb. 28, 1956　　W. C. HUEBNER　　2,736,229
APPARATUS FOR COLOR SEPARATION
Original Filed July 18, 1947　　6 Sheets-Sheet 4
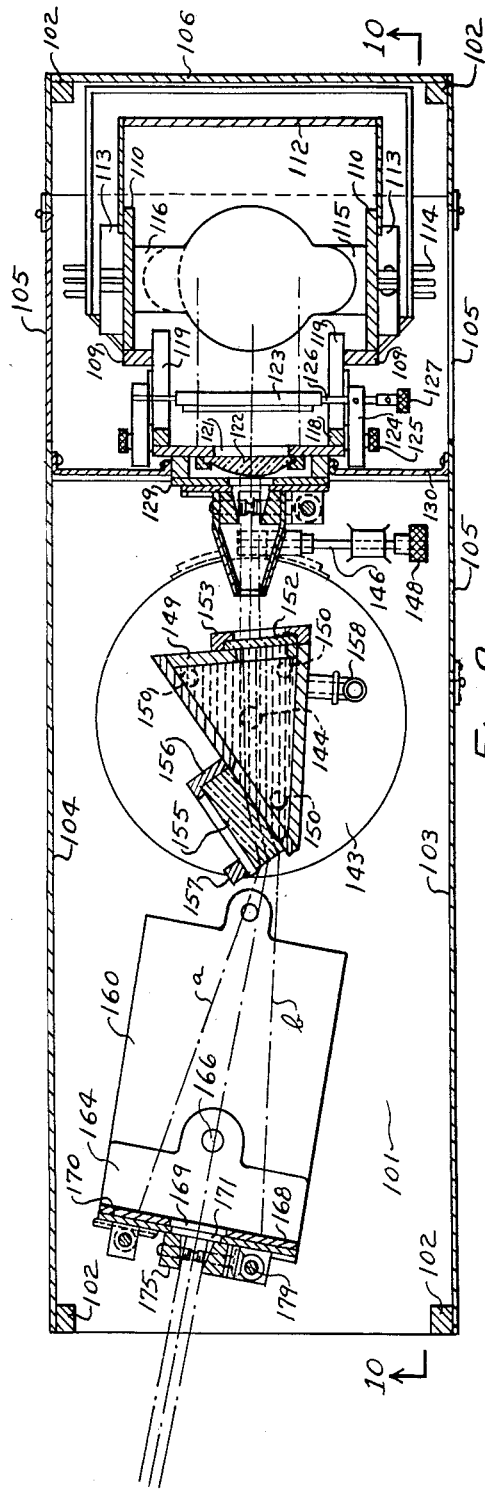
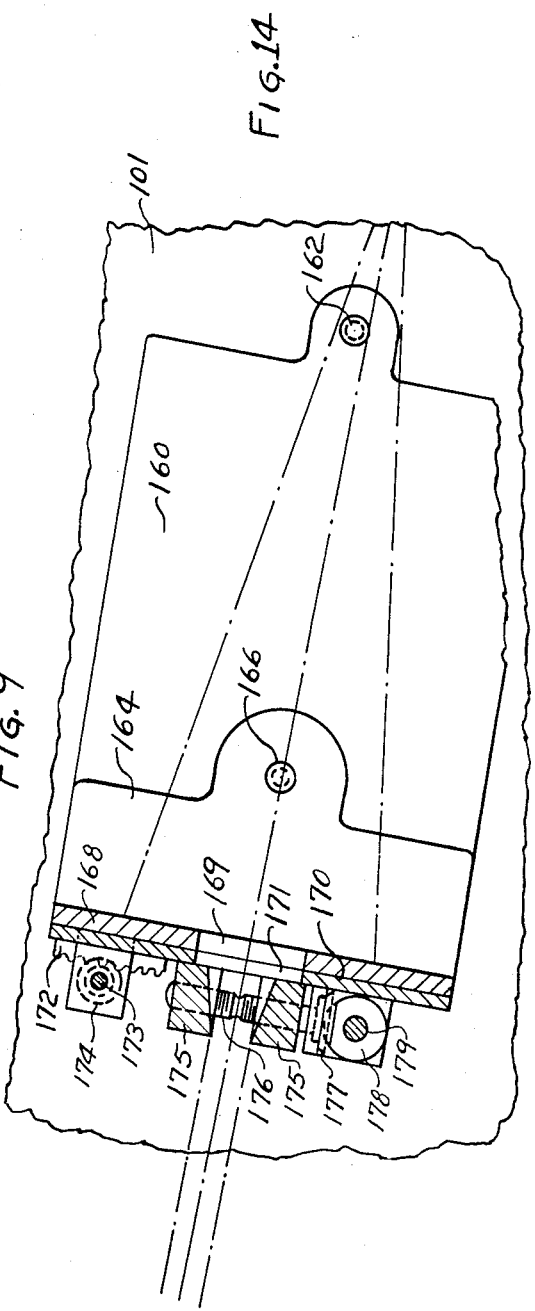
INVENTOR.
WILLIAM C. HUEBNER
BY Hudson Doughton,
Williams, David & Hoffman
ATTORNEYS Feb. 28, 1956 W. C. HUEBNER 2,736,229
APPARATUS FOR COLOR SEPARATION
Original Filed July 18, 1947 6 Sheets-Sheet 5

INVENTOR.
WILLIAM C. HUEBNER
BY Hudson, Boughton,
Williams, David & Hoffmann
ATTORNEYS Feb. 28, 1956 — W. C. HUEBNER — 2,736,229
APPARATUS FOR COLOR SEPARATION
Original Filed July 18, 1947 — 6 Sheets-Sheet 6

INVENTOR.
WILLIAM C. HUEBNER
ATTORNEYS

# United States Patent Office 2,736,229
Patented Feb. 28, 1956

2,736,229

APPARATUS FOR COLOR SEPARATION

William C. Huebner, Mamaroneck, N. Y.

Original application July 18, 1947, Serial No. 761,783, now Patent No. 2,614,042, dated October 14, 1952. Divided and this application September 6, 1952, Serial No. 308,228

5 Claims. (Cl. 88—24)

The present invention relates to apparatus for color separation in photographic reproduction of color copy and, more particularly, it relates to apparatus for making component color separation records on photo sensitive plates or film from color copy with the aid of monochromatic light such as white light.

This application is a division of my copending application Serial No. 761,783, filed July 18, 1947, now Patent No. 2,614,042, issued October 14, 1952, wherein the method of making the component color separation records is claimed and, in addition, this application discloses a modified form of apparatus for the purpose stated and not shown in said copending application.

There are two general classifications of color copy which may be reproduced in the graphic arts. The first includes opaque color copy such, for instance, as a painting or drawing made with color media as water colors, oil paints, pastels or dyes on opaque surfaces. Copy of this description can only be viewed or photographed with light reflected from the surface thereof. The second class of color copy includes transparencies, usually produced with color sensitive film. Film or plates of this description are in general use employing color dyes to represent the images on transparent surfaces and these must be illuminated from the back of the plate or film and viewed or photographed from the front thereof.

With the increasing demand for printed color reproduction it becomes necessary to reproduce both opaque color copy and transparent color copy with greater speed, at less cost, and with improved qualities. Obviously, the printing plates for color reproduction must be made to suit the usual requirements of the various printing methods such as relief, gravure, offset, gelatine, or dye expulsion; printed with pressure or electronographic presses without pressure. This, in turn, requires an increase in the speed and the accuracy of color separation as the first important step in color processing.

Color begins with light. Hence, color copy must be illuminated evenly with the proper intensity and also the proper quality of light. Experience with white flame carbon arc lamps to illuminate copy for photographic color reproduction has indicated certain limitations in this light source. The light from a carbon arc is emitted from a small space between the carbons, requiring that the arcs be spread and moved away from the copy to avoid "hot spots" resulting from a non-uniform illumination. Quite frequently, with the use of carbon arc lamps, there is a limit to the possible movement of the arc lamps away from the copy, particularly in crowded photographic galleries where space is not available, and more frequently a uniform illumination is difficult because the distance of the copy from the camera lens does not permit the most desirable placement of the arc lamps.

A further difficulty with carbon arc lamps occurs because the space between the carbons, when the lamp is "on" varies with fluctuations in the line voltage supplying the lamps and also with non-uniform combustion of the carbons. Thus, the length and position of the arc core is constantly moving and changing in size, affecting the intensity of light and its color characteristics applied to the color copy and consequently affecting the photographic plate or film being produced.

Corrective control devices, such as voltage regulators for the current supply line, an electronic phototube, or photocell light quantity and time integrators are helpful, but they do not correct uneven illumination which is always present when carbon arc lamps are used to illuminate flat copy surfaces. Intense heat from carbon arc lamps and carbon dust resulting from combustion are also undesirable and inconvenient results from the use of carbon arc lamp illumination.

Ordinarily, when producing color separation negatives for printing processes the light projected to or projected through the copy must be filtered according to the technique employed. Color filters usually consist of a transparent film base dye stained with a color which is intended to be complementary to that color to be separated and printed in color ink. For example, in three-color process work, a purple color filter is used in producing the yellow plate, an orange filter for the blue plate, and a green filter for the red plate. Frequently all three filters are exposed for a short period of time to produce a black plate. Color filters are usually inserted in a slot in the barrel of the camera lens and centered between the nodal points in the lens or they may be placed directly in the path of the image.

The separated color is represented in the negative by transparent graduations of tone value comprising the color image. In the case of relief printing plates, when this negative image is printed by contact upon a sensitized printing plate, the action of the printing light takes place through the transparent portion of the negative rendering the image relatively insoluble and when developed the light hardened image becomes a positive image. This image resists etching acid, and a relief etched plate is obtained, and ink applied to the relief image yields on the paper the selected color image which was filtered or separated as above described.

The time consuming procedure now follows since the values of each component color separation must be corrected for deficiencies by staking, etching and reetching locally where the separation is faulty and out of balance and where it does not faithfully render the true values of the color copy. There are various causes for faulty separation color values as, for instance, impure colors in the filters; also the separations may be out of balance with each other. Furthermore, the separations may not be the true complementaries of the color inks used in printing.

Copy color also has its effect, the white base of opaque color copy being only approximately white for photographic action. Likewise, all full strength colors, including black, reflect some light and affect the sensitized plate or film being exposed in the camera. Thus two pieces of copy will affect the sensitized surface differently for the same exposure, and retouching and reetching are needed to attain a balance when printed with one set of color inks.

It is well known by expert color printers that the hues and chroma of yellow and blue printing inks combined to produce green yield only approximately and to a limited extent the varieties of greens that are visible in a fine color transparency. Similarly, purples and lavenders are limited in their brilliance because of the limitations of the red and blue inks which produce purple. These defects persist regardless of expert reetching or retouching and the many hours of costly labor consumed in the production of photo mechanical photo printing plates.

Labor, in addition to that of camera operators, which is required to balance the color result is variable. The judgment of color etchers, retouchers and provers varies constantly and further affects the quality of the result through expert guesswork, thus increasing the time required to produce a color job and increasing the delays and unnecessary expense in the final production.

It is the principal aim of the present invention to improve upon these defective and time-consuming procedures by providing novel, simple and dependable apparatus for performing the operational steps of color separation.

A further important aim or object is to provide an apparatus for producing a color separation negative of a color copy and which apparatus is such that a copying camera can be focused on the color copy with the field of view of the objective lens of the camera taking in the entire surface of the copy and wherein light from a white light source is passed through a prism which is at least equal in length to one dimension of the copy, and wherein the spectrum thus produced is masked to form a band of light of a single predetermined color of substantially uniform density throughout and coextensive in length with one dimension of the copy but fractional in width compared to the other dimension thereof, and which apparatus can project upon an extremity of the unlighted copy the referred to band of light to uniformly illuminate a zone of the copy corresponding to the area of the band, with the apparatus including provision for moving the band of light to scan the entire area of the copy while simultaneously photographing the copy.

A further object is to provide apparatus such as referred to in the preceding aims and objects and which is capable of projecting a selected band of color light onto the face of an opaque color copy and then scanning said face with the color band or of projecting the band through a transparency copy and scanning the entire area of the latter copy.

Another object of the invention is to provide apparatus as referred to in the preceding aims and objects and which apparatus includes provision for all necessary adjustments to meet varying situations and is easier to operate, accurate in its performance and greatly reduces the cost and time involved in the making of color separation negatives from either opaque or transparent color copy.

The apparatus embodying my invention includes improved means for reflecting color light to the camera from opaque copy and for transmitting color light to the camera through transparent copy for producing color separations which includes the substitution of white light tubes for carbon arc lamps as a source of light. In place of filters the source of light is broken down into its component spectrum color bands and the particular color band desired for the negative color separation is used. A light tube is placed behind a prism at a point where the spectrum colors are brightest and where the color bands emitted are at their maximum width. All colors of the spectrum appear through the prism as narrow bands varying in width and provision is made for adjustable rotation of the prism on its axis and in certain instances for adjustment thereof at right angles thereto. A masking device having an elongated adjustable slot is provided between the prism and copy to permit only the selected color band to be projected therethrough. Suitable adjustments for the mask permit the projected color light to illuminate the color copy in a manner whereby the entire band is within full range of the lens of a camera for the full area of the copy when the light band is moved over the copy to scan the entire surface area thereof. The slot opening is set adjacent the copy whereby the color light will illuminate at its most brilliant focus from the full length of the slotted mask.

The lamp and prism, including the adjustable light masks, are mounted as a unit and are moved at a given speed with respect to the copy so that the projected color light beam will traverse or scan the entire surface of the copy. In one instance the color light beam extends horizontally of the copy and the unit is moved vertically to cause the color light beam to move vertically of the copy to scan the latter. In another instance the color light beam extends vertically of the copy and the unit is moved horizontally to cause the color light beam to move horizontally in scanning the surface of the copy. The light tubes may be of any suitable type to provide a suitable source of white light and in certain instances they may be flash tubes and may be connected with a rotating switch which sends pulses of current built up in the condensers to the tube at timed intervals during the movement of the device across the face of opaque copy or across the back of transparent copy.

All other light is excluded from the space between the copy and the lens in order to permit the lens to project the entire image area during illumination onto the color sensitive plate or film in the camera. Thus, only the pure color of the spectrum is used to filter out the color of the copy needed to reproduce the selected color for printing with ink or dye from a set of photo mechanical color plates.

Adjustments are provided to position the light source, the prism and the slots to obtain a balance of complementary colors using prescribed arrangements for two, three, four, five or six color combinations according to requirements for predetermined color results needed for the ink or dye multicolor printed edition produced on printing presses. For example, the use of the following approximate color bands constitutes the procedure for a five color set of separation plates or films: The purple light band is used for the yellow ink plate, the green light band is used for the red ink plate, the orange light band is used for the blue ink plate, the red light band is used for the green ink plate, and the yellow light band is used for the purple ink plate. Combination exposures of two or more color bands may be used to produce a black or neutral separation plate or film, and also for split colors such as half strength red or blue.

My invention contemplates embodiments thereof which may vary from each other in respect to the direction of the scanning movement of the color light band across the surface of the copy, the adjustments given to the prism and the masks and in certain other details as will become apparent when the various forms of apparatus embodying the invention disclosed herein are described in detail hereinafter.

Referring to the accompanying drawings forming part of this specification and disclosing several forms of apparatus embodying the invention, Fig. 1 is a front elevational view of one form of such apparatus and wherein the color light beam extends horizontally across the copy and is moved vertically to scan the surface of the copy;

Fig. 2 is an enlarged fragmentary view of the centrally located mechanisms of Fig. 1, with an enclosing cover removed to show constructional details;

Fig. 3 is a view taken on irregular line 3—3 of Fig. 2;

Fig. 5 is a side elevational view similar to the upper portion of Fig. 3 and showing an alternative arrangement;

Fig. 6 is a front elevational view of another form of apparatus embodying the invention and wherein the color light beam extends vertically of the copy and moves horizontally in scanning the surface of the copy;

Fig. 7 is a plan view taken from line 7—7 of Fig. 6;

Fig. 8 is a central sectional view through the base of the apparatus shown in Fig. 6 and is taken substantially on line 8—8 of Fig. 7;

Fig. 9 is a horizontal sectional view on an enlarged scale through one of the color light beam producing units shown in Fig. 6 and is taken substantially on line 9—9 of Fig. 6;

Fig. 14 is an enlarged sectional view of the left-hand portion of Fig. 9 to illustrate the construction of the shutter or masking part of the unit.

Referring to Figs. 1 to 5 inclusive of the drawings, the embodiments of the invention illustrated therein are adapted to be used with a precision color camera of the overhead type, wherein the relatively large and heavy mechanical components are suspended from an elevated supporting structure. Persons familiar with photographic reproduction for printing and engraving will be familiar with the basic elements of copying cameras including the camera itself and the copyboard used for supporting and positioning copy with respect to the lens of the camera to give prescribed enlargement or reduction of size. Persons skilled in the art will also be familiar with the conventional sources of illumination for cameras of this kind which are likewise adjustably supported either individually from the floor or on carriages which are movable on the camera framework. While reference is made herein to the camera and the copyboard, details of construction of these elements are omitted for the sake of clarity, the invention being mainly directed to the illumination of the copy.

Figures 1, 4:
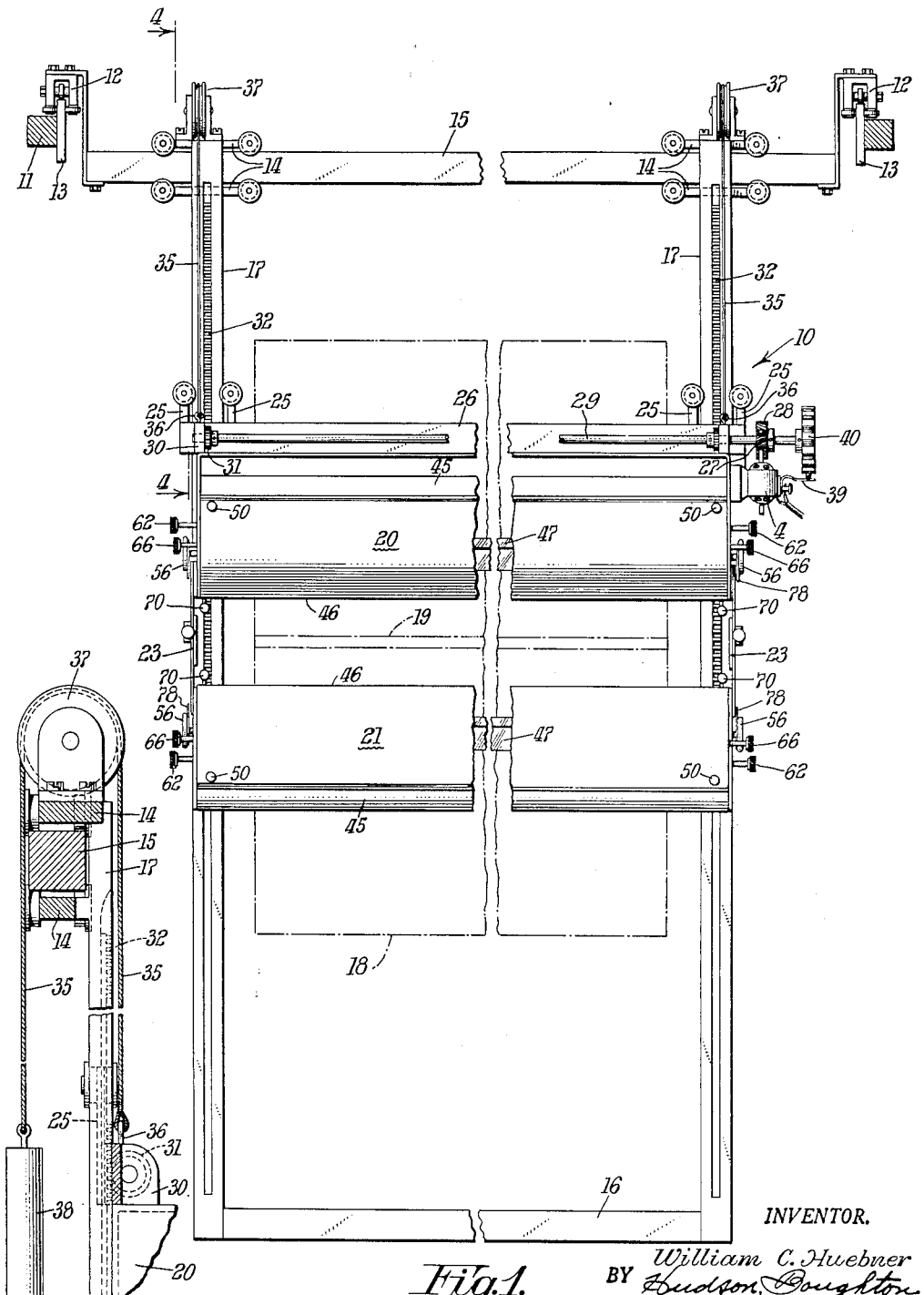
Fig. 4 is a fragmentary side elevational view of counterbalancing device employed in the apparatus and is taken on line 4—4 of Fig. 1.

In Figure 1 an illuminator supporting framework, generally indicated at 10, is shown suspended from the overhead bars 11, these bars being disposed longitudinally of the camera and used primarily to support the camera and copyboard. Framework 10 is constructed so that it may be rolled along bars 11 for positioning with respect to the copy and the lens of the camera traveling on companion three-way roller guides 12 located on the right and left sides thereof, which ride on tracks 13 secured to bars 11. Provision is made so that the central portion of the framework, including the vertical frame members 17, may also be moved from side to side on opposed pairs of horizontally movable trolleys 14 which are arranged to roll on cross-member 15 suspended between depending brackets on guides 12. Tie bar 16 extends between the frame members 17 at their low extremity thus maintaining parallelism. Copy 18 shown here in phantom is suitably arranged on the copyboard, centrally of the two vertical frame members 17, so that it is in position for photographing.

The framework 10 forms the support for illuminator devices comprising mainly a top illuminator 20 and a bottom illuminator 21, which will be hereinafter described in detail, located either in front of copy 18 between the copyboard and the camera for producing light to be reflected from opaque copy, or arranged behind transparent copy for transmitting light therethrough to the camera. This description treats the arrangement for reflected light from copy and it will be obvious that transposition and rearrangement of parts may be made to adapt the equipment for transmission of light through transparencies.

Illuminator assemblies 20 and 21 cooperate to focus their emitted light to a narrow band 19 of copy 18, and they are adjustably fastened totgether, one above the other, by the side braces 23 which are suitably fixed thereto and which may be moved and clamped with respect to one another to vary the spacing between the illuminators. As an assembly, illuminators 20 and 21 move vertically on the framework 10 and in so moving cast light over the entire copy area, control for movement being provided principally by two pairs of trolleys 25 which straddle and roll on the depending bars 17. Trolleys 25 are secured indirectly with the top illuminator 20 being fixed to cross member 26 which is rigidly fastened to this illuminator.

Driving means is provided to move the illuminator assembly as indicated, whereby the assembly is raised or lowered as a unit, the drive originating in a small reversible electric motor 24 suitably mounted on the top illuminator 20. Worm 27 on the shaft of motor 24 engages and drives a worm wheel 28 on horizontal shaft 29 thereabove which is trunnioned in bosses 30 on cross bar 26. As shaft 29 is turned spur gears 31 which engage racks 33 on the vertical frame members 17 being fastened thereto will also turn and will move the illuminators upward or downward depending upon the direction of motor rotation. Suitable electrical switching and controlling devices, not shown, are provided in circuit with motor 26 to initiate and regulate the drive for the illuminator assembly either upwardly or downwardly over the face of the copy.

A counterbalance is provided for the illuminators to equalize the upward and downward driving force requirements. This device, as shown in Fig. 4, consists of a pair of supporting cables 35, fastened to the eye bolts 36 fixed to the ends of cross-member 26, thence trained over pulleys 37 suitably fastened above trolleys 14, and finally extending down over the opposite side of the framework to engage a pair of counterbalancing weights 38. Springs may be substituted in place of weights 38 if desired, the important feature being the balancing provision whereby a small motor may be made to serve the driving requirements in either direction.

It will be understood at this point that the illuminator assembly moves continuously and at a relatively slow speed when motor 24 is operating. Timed to this movement a commutator 40, fastened to the right hand end of shaft 29, with suitable switching accessories 39 and current supply provides electrical impulses to trip the illumination means, as will be more clearly pointed out as the specification proceeds.

Referring now to Figures 2 and 3, the illuminators 20 and 21 are substantially identical, each being provided with a calibrated tubular flash lamp 41, operated through high capacity electrical circuits, not illustrated, to emit a desired intensity of illumination at a desired spectral composition. Lamps 41 are sufficiently long so that they extend over the entire width of the maximum size of copy to be photographed and they are retained in holding sockets 42, mounted against the inner surface of the end enclosing covers 43, with electrical connecting leads 44 directed thereto from commutator 40 and its switching means previously mentioned.

By reason of their operating characteristics, photographic lamps of this style are intermittently flashed in order that a sufficient period of time will be permitted between flashes for the lamps to cool, during which interval of time a charge is built up in the condensers in the lamp circuits. As arranged, the flash of both lamps is simultaneous, both lamp circuits being connected with the single commutator 40. However, by using a dual commutator or with the use of other devices the flash lamps may be operated alternately if there is an advantage in such operation.

Partially surrounding lamps 41 between the end enclosing covers 43 are the semi-cylindrical lamp housing covers 45 which are hinged with the main illuminator housings 46 so that they may swing away for lamp repairs or replacement. The main illuminator housings 46 are likewise located between the end enclosing covers 43, forming light tight enclosures, each of which contains a triangular optical glass prism 47 substantially coextensive in length with the flash tubes and receiving light therefrom through an elongated slotted aperture 48 in the main illuminator housing. The quantity of light passing from aperture 48 to prism 47 may be regulated by the adjustably guided mask 49 fixed adjacent the aperture and movable toward and away from each other by means of the threaded adjusting screws 50 located at the sides of the illuminators and projecting through housings 46 which, on their threaded ends, engage right and left hand threaded lugs 51, 51' on the masks.

Each prism 47, Fig. 2, is retained between a pair of flat cylindrical mounting disks 55 suitably calibrated for angular positioning having shaft extensions 55a integral therewith which project through both end covers 43. Hand wheels 56 attached to shaft extensions 55a permit the prism to be angularly adjusted on its axis by manipulation at the outside of the illuminator housing. Journaling of the shaft extensions and rectilinear adjustment of the prism with respect to its axis is provided by associating the mounting disks 55 with transversely movable slides 57 which, in turn, are guided on vertically movable slides 58. Intermediate the mounting disks 55 and the transverse slides 57 are large anti-friction washers 59 which are fitted over the shaft extensions 55a to provide the proper spacing between the mounting disks 55 and the transverse slides 57 and to allow angular movement without objectionable frictional resistance.

The transverse slides 57 are substantially flat square plates drilled for the passage therethrough and journaling therein of the extension shafts 55a, beveled on one edge for confinement against a corresponding reversely beveled projecting edge of the vertical slides 58. On their edges opposite to the beveled edges transverse slides 57 are provided with rack teeth which mesh with spur gears 60 on the horizontally disposed adjusting shaft 61, which is trunnioned in the vertical slides 58 and which projects through the covers 43. Adjusting knobs 62 located on the ends of adjusting shaft 61 permit this shaft to be turned, and when turned, spur gears 60 will move slides 57 transversely of the illuminator assembly. By reason of the interconnection of the slides 57 with the extension shafts 55a of disks 55, the prism 47 will also be moved in a transverse direction.

A similar construction is used for the vertical slide members 58 which have rack teeth cut on one edge and are guided for vertical movement by gibs 63, Fig. 3, directly fastened to end plates 43. Adjusting shaft 64 is trunnioned directly in end covers 43 and carries a pair of spur gears 65 mounted thereon. This shaft may be turned by either of the knurled knobs 66 to move the plates 58 which, in turn, will carry therewith the plates 57 and likewise disks 55 to which the prism 47 is attached.

End closing covers 43 are provided with suitable clearance for the adjusting shafts and for the extension shaft on disks 55. Inasmuch as the latter will move both transversely and vertically with respect to the covers, it is necessary that this clearance take the form of an enlarged circular opening. The clearance in end covers 43 required for the transverse adjusting shaft 61 may be a vertical elongated slot since this element moves only vertically with respect thereto, being trunnioned in slides 58. Clearance for rotation only is required in covers 43 for shaft 64 since it is trunnioned therein as heretofore explained. Transverse clearance is also required in the vertically adjustable plate 58 to permit the prism, disks 55 and transverse plates 57 to move transversely without affecting the transversely fixed position of those plates.

Referring particularly to Figure 3, light passing through prism 47 is directed obliquely therefrom, dependent upon the wave length, a portion of which is permitted to pass through the elongated aperture 68 in housing 46 and thence between the adjustable masks 69, constructed similarly to the masks 49. Masks 69 may be adjusted for a prescribed width of aperture by turning either of the knurled head screws 70 which engage the right and left hand threaded lugs 71, 71' on masks 69. From the illuminator housing the particular band of light passing through masks 69 is directed to be intercepted by the copy 18 at the narrow width band 19, which is in full range of the lens of the camera shown to the left of Fig. 3 at 75.

It will thus be understood that any desired range of wave length of light may be used to illuminate the copy strip 19 to give the most desirable photographic result. Masks 49 between lamps 41 and prisms 47 permit only a selected strip of brilliant white light to strike the prism from the source 41. Prisms 47 break the light down to its component color bands which may be suitably directed therefrom by angular and rectilinear adjustment. Masks 69 permit only a selected band of the components of the light from the prism to strike the copy. Equalization of lighting by a particular color band is effected by adding illumination from low illuminator 21 to that from high illuminator 20 at illuminated strip 19 with the light of the range of wave lengths striking the copy in reverse order of magnitude.

As an alternative construction for the above described illuminator housing and to avoid the cost of optical glass prisms, a similar light-tight housing 46' fitted with a hinged cover 45' may be provided as shown in Fig. 5, wherein a flashing high intensity light source 41' is located behind an elongated aperture 68' fitted with adjustable masks 69' controlled by the adjusting screw 70'. In this construction I use a conventional style of optical filter 76, selected for the process which covers the elongated aperture 68' and which is suitably clamped to the inside of the lamp housing. Light emitted from illuminator 20' which has passed through filter 76 strikes the narrow copy band 19 in the same manner as that described above from illuminator 20 and similar devices are used to control the movement of the illuminator with respect to the copy in order to cast a prescribed monochromatic light over the entire copy area. A still further modification may be resorted to by eliminating the filter 76 of illuminator 20' and substituting tubular lamps constructed with a filtering glass covering of special characteristics for the white light flash tube.

In operation the copyboard and camera setup is made in the usual manner, as is well known in the art, and the illuminator frame 10 is rolled to a desired position with respect to the copy. In using the flash lamp and prism illuminators for a source of monochromatic light, prescribed settings are made for the axial and rectilinear location of the prism and for the mask openings which direct light to and from the prism depending upon the color band desired. For angular prism settings made outside of housing 46 dials 77 on the ends of the housings may be read in conjunction with indicators 78 fixed on the extension shafts 55a. Lamp switches are turned to "on" position to give the intermittent flashing of the specified color band, and the apparatus is adjusted so that the band or strip 19 is disposed just below the copy. In accordance with customary camera procedure all extraneous light is avoided so that the only light striking the copy will be that from the illuminators 20 and 21 as they move upwardly. Switching means are then turned on which will cause the flashing illuminated strip 19 to slowly traverse the copy and at the same time the camera shutter is opened so that the reflected light from the copy will be carried to the plate or film being exposed.

After the illuminators have moved as a unit to an extreme upward position past the copy, the lamp switching means will be turned "off" and the camera shutter closed.

This procedure will be repeated for each exposure made, the number of which as has been explained, will depend upon the particular process followed and upon the copy being reproduced, the illuminators being returned to the down position between exposures.

While the construction illustrated treats the use of my improvements with overhead cameras it will be apparent that the invention is not so limited and that suitable equipment may be accordingly devised for other types of reproduction cameras. Likewise, instead of vertical travel, the illuminators may be moved horizontally from side to side if necessary or desirable to provide a beam of selected color light extending vertically of the cap.

A construction embodying the invention and including the variations referred to in the preceding paragraph is illustrated in Figs. 6 to 14 inclusive, in fact, the construction of Figs. 6 to 14 inclusive may be considered the preferred form of the invention at the present time. In the embodiment shown in Figs. 6 to 14 inclusive the beam of light extends vertically of the copy and is moved horizontally thereof in scanning the surface of the copy. In this form of apparatus there is a base 80 which may rest on the floor or other suitable support and forms the lower part of a frame structure. The frame structure at each end of the base 80 has vertically extending supports 81 which have secured to their upper ends a top portion 82 that is parallel to the base 80. The base 80 and top 82 are provided with parallel ways 83 and 84 extending longitudinally of the frame and spaced transversely thereof and such ways may be of the dovetail type or any other suitable type, as will be well understood in the art. The pairs of ways 83 and 84 each slidably supports an identical carriage 85 with the carriage 85 on the ways 83 extending upwardly and the carriage 85 on the ways 84 depending therefrom vertically downwardly. Each carriage 85 is provided on its side adjacent to its supporting ways with a lug 86 that extends between the parallel ways of the respective pair of ways. Each of the lugs 86 mounts a fixed nut which cooperates with a feed shaft later to be explained. The base 80 rotatably mounts a shaft 87 extending longitudinally of the base intermediate the ways 83 and parallel thereto. The shaft 87 has a screw threaded portion 88 which is threaded in the nut carried by the lug 86 of the lower carriage so that rotation of the shaft 87 and screw threaded portion 88 effects longitudinal movements of the carriage along the ways, as well be well understood. The shaft 87 is driven from any suitable power source in the desired direction and at a predetermined speed as, for instance, it may be driven by suitable electric motor 89. The top 82 mounts a similar shaft indicated diagrammatically in Fig. 6 by the dash lines at 90, it being understood that the shaft 90 is parallel to the shaft 88, extends longitudinally of the frame and is located intermediate the ways 84, and comprises a screw threaded portion comparable to the portion 88 of the shaft 87 and of the same pitch. The shaft 87 is operatively connected to the shaft 90 so that both shafts rotate at the same speed and in the same direction, such operative connection being indicated diagrammatically in Figs. 6 and 8 by the gear 91 on the shaft 87, the gear 92 on the shaft 90, and a one-to-one driving connection between the gears 91 and 92 indicated by the dash and dot lines 93 of Figure 6. Each carriage 85 rotatably mounts a turntable 94 which is provided on its side adjacent to the carriage with a centrally located stud 95 that extends through a bossed central opening in the carriage and has fixed to its lower end within the carriage a worm wheel 96. A shaft 97 is rotatably supported by each carriage 85 and extends outwardly of one side of the carriage where it is provided with a polygonal wrench receiving portion 97a. Each shaft 97 mounts a worm 98 that meshes with its respective worm wheel 96. It will be understood that each turntable 94 can be rotated or angularly adjusted on its respective carriage by applying a suitable wrench tool to the polygonal head 97a and rotating the shaft 97 in the desired direction. Each turntable 94 will be held in its angularly adjusted position due to the locking action between the worm wheel 96 and the worm 98.

In Figures 6 and 7 the color copy is represented at 99 and is defined by the dot and dash lines. The copy camera is indicated in Fig. 7 at 100 and may be any well known copy camera. The camera is focused on the copy 99 so that the entire surface of the copy is within the view of the lens of the camera. In Figs. 6 and 7 the color copy is opaque copy with the camera arranged on the same side of the copy as are the units which produce the scanning beams of light, it being understood that, in this instance, the camera photographs by reflected light. If the color copy is a transparency then the camera would be located on the side of the copy opposite to the side that is scanned by the beams of light and would photograph the copy by means of light transmitted therethrough.

Identical light beam producing units A and B are secured to the exposed flat surfaces of the turntables 94 with the unit A extending vertically upwardly from its turntable 94 and the unit B extending vertically downwardly from its turntable 94. Inasmuch as the units A and B are identical the construction of one unit only needs to be described herein.

Figure 10:
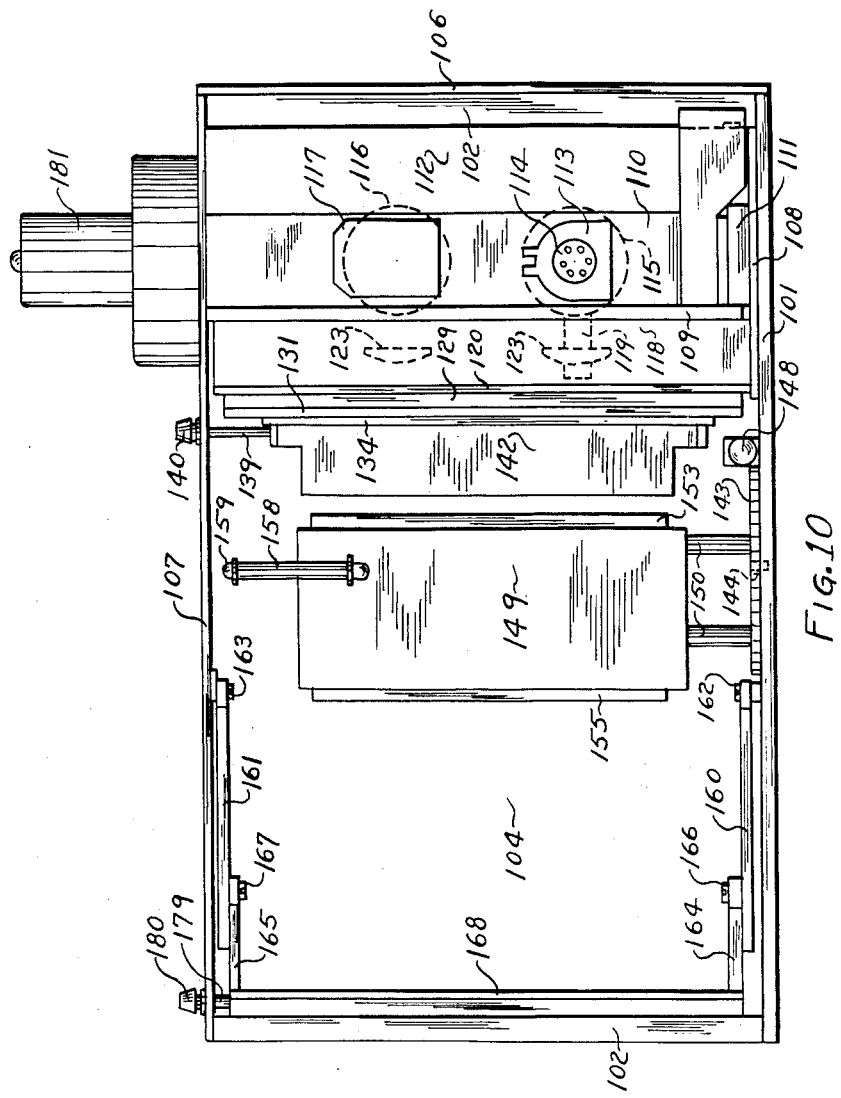
Fig. 10 is a side elevational view of the unit shown in Fig. 9 but on a different scale and is taken from line 10—10 of Fig. 9 with the closure plates of the unit on the one side thereof removed.

Referring first to Figure 10, the base plate of the unit is shown at 101 and it is this plate which is secured to the turntable. At each of the four corners of the base plate 101 there are vertical posts or columns 102, see Fig. 9. Vertically extending front and rear side panels 103 and 104 are secured to the posts 102 and said side panels may be provided with suitable hinged doors 105 to close the openings in the panels that afford the operator access to the various parts of the unit for purposes of adjustment, maintenance and operation, as will be well understood. It will also be understod that such openings and hinged doors will be provided in the panels wherever it is necessary to furnish access for the purposes stated to the parts of the unit. One end of the unit, i. e., the right-hand end as viewed in Figs. 9 and 10, is closed by an end panel 106 while the opposite end of the unit is open for a purpose later to become apparent. The unit also is provided with a top panel 107 secured to the corner posts 102.

Figures 11, 12, 13:
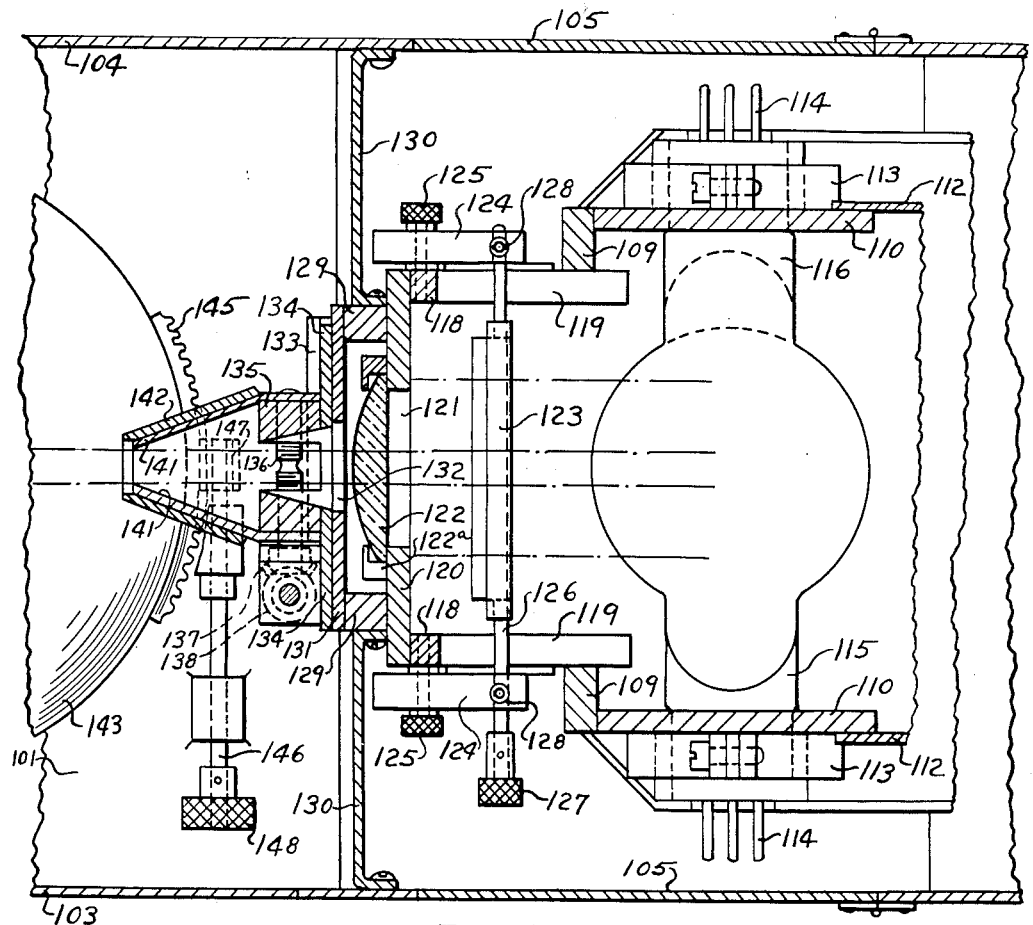
Fig. 11 is a fragmentary sectional view corresponding to the right-hand portion of Fig. 9 but on a substantially increased scale and includes that part of the unit containing the light source, the vertical dispersing and the horizontally concentrating lenses and the adjustable focusing means for the beam of white light passing from the light source to the prism.
Fig. 12 is a fragmentary sectional view of the focusing means or hood for the white light beam with the parts thereof shown in an adjusted position different from the position of the parts in Fig. 11.
Fig. 13 is an enlarged sectional view of the prism shown in Fig. 9.

The housing for the light source of the unit located at the right-hand end of Figs. 9 and 10 and shown on a larger scale in Fig. 11 will now be described. A supporting plate 108 is secured on the upper side of the base plate 101. Vertical housing members 109 have their lower ends connected to the supporting plate 108 and their upper ends to the top panel 107 and are arranged in parallel relationship but spaced apart transversely of the unit. Secured to the members 109 are parallel spaced apart lamp supporting panels 110 which at their lower ends are laterally flanged, as indicated at 111, and are secured to the supporting plate 108 while their upper ends are secured to the top panel 107. A U-shaped enclosure 112 has its parallel legs secured to the panels 110 and said enclosure extends vertically of the unit between the supporting plate 108 and the top panel 107. Each panel 110 is provided on its outer side and in alignment with an opening in the panel with a supporting element 113 for the light producing lamp, the outlet terminals of which are indicated at 114. The supports 113 are arranged on their respective panels 110 at different vertical levels so that the lamps 115 and 116 carried thereby are spaced vertically one above the other, as clearly indicated in Fig. 10. Each panel 110 in line with the lamp carried by the other panel 110 is provided with an opening over which is detachably mounted a closure plate 117.

The portion of the housing for the light source of the unit which contains the lens system that first disperses the light from the lamps in a vertical direction and then contracts the vertically dispersed light horizontally to produce a narrow vertically extending beam of light will now be described. Vertical panel members 118 are secured to the vertical housing members 109 and are supported by the supporting plate 108 and extend longitudinally of the unit in parallelism with each other. The panels 118 are provided with aligned horizontally extending slots 119 for a purpose later to be pointed out. A lens supporting panel 120 is secured to the ends of the panels 118 that are remote from the vertical supporting members 109 and said lens supporting panel extends vertically of the unit from the supporting plate 108. The lens supporting panel 120 is provided with a vertically extending slot 121 of such length that it extends from below the level of the lowermost lamp 115 to above the level of the uppermost lamp 116. The slot 121 is closed on the side of the panel 120 that is remote to the lamps by a lens 122 extending the full vertical length of the slot and supported in position by means of suitable lens supporting strips 122a secured to the panel 120. The lens 122 functions to contract horizontally into a narrow, vertically extended light beam, the light which strikes it through the slot 121 and which has been vertically dispersed by a pair of vertically spaced adjustable lenses 123 arranged intermediate the slot 121 and the lamps and extending parallel to each other and substantially horizontally.

The mounting support for the lenses 123 will now be described. Two pairs of arms 124 are pivotally connected to the outer sides of the panels 118 by means of lock screws 125 with said arms 124 overlying the slots 119 in the panels 118. Each pair of arms 124 overlie the slots 119 and rotatably support adjacent their ends a shaft 126 which can be adjustably rotated by means of a knurled knob 127 and then clamped in adjusted position by means of setscrews 128. Each shaft 126 supports a lens 123. It will be noted that two ranges of adjustment may be given to each lens 123. One range of adjustment consists in loosening the lock screws 125 of each pair of arms 124 and moving said arms pivotally the desired amount within the limits of the width of the slots 119 and then locking the arms in adjusted position by means of tightening the lock screws 125. The other range of adjustment is to loosen the setscrews 128 and turn the shafts 126 to angularly adjust the lenses 123. It will be understood that the two ranges of adjustment for the lenses 123, as just referred to, provide ample facility for adjusting the lenses 123 to obtain the proper and desired vertical dispersement of the light emanating from the lamps 115 and 116 so as to have the light project on the slot 121 the full vertical height of the slot and to be evenly distributed over the entire area of the slot so that in effect the light from the two vertically spaced lamps becomes a vertical zone of light as though emanating from a single light source. As already stated, this vertical zone of light is contracted in its horizontal dimension by the lens 122 so as to produce a beam of light having extended vertical dimension but a predetermined restricted and relatively narrow horizontal dimension. It will now be understood that light confining curtains can be positioned over the slots 119.

Vertically extending supporting bars 129 are secured to the lens supporting panel 120 on the side thereof that mounts the lens 122 and said supporting bars extend vertically of the unit from the supporting plate 108 toward the top panel 107. Light confining plates 130 are secured to the supporting bars 129 and to the front and rear side panels 103 and 104 of the unit housing and extend between the supporting plate 108 and the top panel 107. A slide supporting plate 131 is secured to the bars 129 and is provided with a slot 132 vertically coextensive with the lens 122 and slot 121 but substantially narrower in width horizontally than the slot 121. The plate 131 adjacent its lower and upper ends is provided with parallel horizontal ways 133 which slidably mount slides 134 that extend vertically but are spaced apart horizontally. The slides 134 have rigidly connected thereto slot bars 135 and which rotatably mount a shaft 136 having oppositely threaded portions cooperating with threaded openings in the slot bars 135 wherefore rotation of the shaft 136 causes the slot bars to move toward or away from each other at identical rates to vary the horizontal width of the vertically extending slot between the slot bars 135. The shaft 136 has fixed thereto at one end a gear 137 which constantly meshes with a gear 138 fixed on a vertically extending shaft 139 rotatably mounted in suitable supports and extending through the top panel 107 where it is provided with an actuating knob 140 wherefore the operator can adjustably move the slot bars horizontally toward or away from each other to get the desired horizontal width to the vertical beam of light.

The slot bars 135 have secured to them convergent hood plates 141 which extend the full vertical length of the slot bars 135 and project longitudinally of the unit from the slot bars as clearly shown in the drawings. It will be understood that the convergent hood plates 141 move toward or away from each other according to the adjustment provided to the slot bars 135 and that said hood plates function to direct a horizontally narrow but vertically extending beam of light into the prism later to be explained with the width of said beam of light predetermined by the adjustment of the slot bars 135 and the plates 141. The hood plates 141 are located within a stationary hood housing 142 which is secured to the stationary slot supporting plate 131 above and below the upper and lower ends of the slides 134 and slot bars 135 carried by said slides.

A circular supporting table 143 is mounted on a central pivot 144 on the upper side of the base plate 101. The supporting table 143 is provided on its circumference with an arcuate rack 145 which in this instance is shown as located beneath the hood housing 142. The base plate 101 is provided with spaced bearing lugs in which is rotatably mounted a shaft 146 held against axial displacement and having fixed to its inner end a gear 147 preferably in the form of a worm and meshing with the rack 145. The shaft 146 may be rotated by a knob 148, wherefore the supporting disk 143 can be angularly adjusted for a purpose later to be explained.

A vertically extending triangular in cross-section prism housing 149 has its lower end rigidly connected adjacent the three corners of the prism housing to vertically extending legs 150 that are rigidly secured at their lower ends to the supporting table 143. The prism housing 149 is formed of any suitable material, preferably metal, and it will be understood that it is closed at its upper and lower ends and that its corner joints as well as its upper and lower ends are made suitably liquid-tight.

One wall of the prism housing 149 is provided with a vertically extending inlet slot 151 that is vertically coextensive with the vertical beam of light. An inlet glass strip 152 is secured over the slot 151 in liquid-tight relationship by means of angled retaining members 159 secured to the outer side of the prism housing. The prism housing 149 is provided with a vertically extending outlet or emission slot 154 which is closed and sealed by the relatively thick emission glass strip 155 held in place by retainers 156 and 157 secured to the outer side of the prism housing. The prism housing 149 is filled with a suitable liquid having the desired and requisite index of light refraction characteristics. As an example of a suitable liquid for this purpose "Carbon Bisulfid" may be used and which has an index of refraction at approximately 1.631. The prism housing may be filled with the liquid through a suitable inlet pipe 158 communicating with the upper end of the prism housing and provided at its upper end with a suitable closure cap 159.

Supporting plates 160 and 161 having their corresponding ends pivotally supported and mounted concentrically on pivots 162 and 163 which are carried respectively by the upper side of the base plate 101 and the underside of the top panel 107 of the unit. The supporting plates 160 and 161 are approximately rectangular and at their pivoted ends are provided with projecting lugs on their longitudinal center lines which receive the pivots 162 and 163. Pivoted to the upper side of the plate 160 and the lower side of the plate 161 are substantially rectangular plates 164 and 165 which are provided intermediate their ends with projecting lugs that receive the pivots 166 and 167, respectively, carried by the plates 160 and 161 and located on the longitudinal center line of the latter plates and adjacent the free ends of said plates. The plates 164 and 165 have attached to their free longitudinal edge a vertically extending plate 168 which is provided midway of its vertical side edges with a vertically extending slot 169. The outer side of the plate 168 is provided with horizontal guideways in which is slidably mounted for adjustment horizontally on the plate 168 a second plate 170 provided midway between its vertical edges with a vertically extending slot 171 adapted to be adjustably aligned with the slot 169 in the plate 168.

The plate 170 is provided on its outer side with a horizontal rack bar 172. The base plate 101 and the top panel 107 rotatably support a vertically extending shaft 173 which has fixed thereto a gear 174 that meshes with the rack 172, wherefore by turning the shaft 173 the plate 170 can be horizontally adjusted on the plate 168 to obtain the desired relationship between the vertical slots 169 and 171. The shaft 173 may be provided with suitable means for the operator to rotate the same to obtain the adjustment just referred to.

The plate 170 is provided with horizontal guideways located above and below the slot 171 and which slidably support parallel slot bars 175 which can be adjusted toward and from each other to form varying width slots through which the vertically extending selected color band of the spectrum projects.

The slot bars 175 have simultaneous and equal adjusting movement imparted thereto by means of a right and left hand screw 176 extending through the slot bars and provided on one end with a bevel gear 177 that meshes with a bevel gear 178 fixed on a vertically extending shaft 179 that is suitably rotatably supported in the unit and is provided on its upper end above the top panel 107 with an operating knob 180. The manner in which the apparatus of Figs. 6 to 14 inclusive operates will now be explained.

It will be assumed that the color copy 99 from which color separations are to be made is an opaque color copy and that the color separations are to be made by reflected light. Therefore the copy 99 will be located relative to the apparatus as shown in Figs. 6 and 7. The camera 100 will be focused on the copy 99 so as to have the entire area of the surface of the copy within the view of the camera lens as clearly indicated in Fig. 7.

The units A and B of the apparatus are adjusted as indicated in Figs. 6 and 7 so that the vertically extending beams of selected color light produced by the units will strike the copy adjacent one end thereof and will extend vertically of the copy with the upper end of the beam from the unit A merging with the lower end of the beam from unit B, wherefore the two beams constitute a continuous and in effect a single vertically extending beam of selected color light. The operator adjusts the lenses 123 so that the light emitted by the lamps 115 and 116 is properly dispersed in a vertical direction to be fully coextensive vertically with the slot 121.

The slot bars 135 are adjusted to provide the desired width of slot through which the light passing through the lens 122 and contracted thereby in a horizontal direction can pass and be emitted from the hood 141, it being recalled that the outlet end of said hood is adjusted in width identically as is the width between the slot bars 135.

The operator adjusts the position of the prism by rotating the table 143, such adjustment although slight having an important and desired advantage, inasmuch as it definitely affects the brilliancy of the selected color band that eventually is projected upon the copy. It will be understood that the adjustment of the prism must be such as to lie within the width limits of the band of white light entering the prism. The operator adjusts the plates 160, 161, the plates 164, 165 and the plate 170 and slot bars 175 to select the desired color bank of the spectrum which will pass through the slots 169, 171 and between the slot bars 175 to produce the vertically extending beam of selected color light on the copy.

Assuming the necessary and proper adjustments have been made in the units to cause the same to project the desired vertically extending selected color light beam on the copy, all light in the room is excluded and the lights 115 and 116 in the units are illuminated while simultaneously the motor 89 is energized to cause the units A and B to move horizontally at the same rate so that the vertically extending light beam or selected color band will scan the entire surface of the copy horizontally, it being understood that the shutter of the camera is open during the entire scanning process so that the camera photographs a color separation of the copy. Each color separation is separately produced in the same way making the necessary adjustments to have the desired selected color band of the spectrum produced by the prism scan the copy.

If desired suitable motor driven air circulating cooling apparatus 181 may be provided for each unit to circulate air around the lamps 115 and 116 thereof.

In the first form or embodiment of the invention the selected color band extended horizontally of the copy and moved vertically thereof to scan the copy. In the second form of apparatus embodying the invention the selected color band extends vertically of the copy and moves horizontally thereof to scan the surface of the copy. In the first form of the invention the prism is angularly adjusted to select the desired color band of the spectrum while the shutter is adjusted for the purpose of regulating the width of the spectrum band. In the second form of the invention the shutter or mask at the emitting end of the unit is adjusted to select the particular color band of the spectrum produced by the prism and also to regulate the horizontal width of the selected color band. In the second form the adjustment of the prism is for the purpose of obtaining the desired intensity or brilliance in the color band of the spectrum produced by the prism.

In said second form, and particularly with reference to Fig. 9, the path of the white light produced by the lamps 115 and 116 is indicated by dot and dash lines and the manner in which said light is refracted as it emits from the glass 155 of the prism is indicated similarly.

It will be understood that the light passing through the prism and emitting therefrom is in the form of a vertically extending spectrum indicated by the lines $a$ and $b$ of Fig. 9, with the color bands of the spectrum being arranged in successive order in a horizontal direction but with each color band extending vertically.

Also it will be understood that if the copy is a transparency the units will be located on the opposite side of the copy from the camera and that the latter photographs by means of light transmitted through the copy.

Although several forms of apparatus embodying the invention have been disclosed, the invention is not to be limited to such disclosed forms except as is necessary by the scope of the appended claims.

Having thus described my invention, I claim:

1. An apparatus for illuminating copy which is to be reproduced in a plurality of separate preselected colors, comprising a first source of substantially white light, a first means for separating the light from said source into its spectrum, means supporting said first means in a position for directing the spectrum upon the copy to be reproduced, a second source of substantially white light, a second means for separating the light from said second source into its spectrum, means supporting said second light separating means in a position for directing the said second mentioned spectrum upon said copy in inverse order to that of the first spectrum and superposed thereon, means to adjust one of said light separating means relative to the other to thereby secure superposition of said selected portions of the two spectra, separate masking means intermediate each of said light separating means and said copy for selectively masking all but a selected band of the corresponding spectrum, and means for producing relative movement between said copy and said light separating means in a direction parallel with said surface while maintaining the said light separating means in predetermined spaced relationship, whereby the copy is scanned by a continuous band of preselected colored light having substantially uniform characteristics throughout its width.

2. An apparatus for illuminating copy which is to be reproduced in a plurality of separate preselected colors, comprising a first source of substantially white light, a first means for separating the light from said source into its spectrum, means supporting said first means in a position for directing the spectrum upon the copy to be reproduced, a second source of substantially white light, a second means for separating the light from said second source into its spectrum, means supporting said second light separating means in a position for directing the said second mentioned spectrum upon said copy in inverse order to that of the first spectrum and superposed thereon, separate housings enclosing said first and second light sources and each having an aperture the length of which is at least equal to one transverse dimension of the copy to be reproduced, separate means cooperating with said apertures to vary the width thereof, the said light separating means having a length at least equal to the said one transverse dimension of the copy and being disposed adjacent said apertures, separate means cooperating with said apertures to vary the width thereof, separate masking means intermediate each of said light separating means and said copy for selectively masking all but a selected band of the corresponding spectrum, and means for producing relative movement between said copy and said light separating means in a direction at right angles to said one transverse dimension while maintaining the said light separating means in predetermined spaced relationship, whereby the copy is scanned by a continuous band of preselected colored light having substantially uniform characteristics throughout its width.

3. An apparatus for illuminating copy which is to be reproduced in a plurality of separate preselected colors, comprising a first source of substantially white light, a first means for separating the light from said source into its spectrum, means supporting said first means in a position for directing the spectrum upon the copy to be reproduced, a second source of substantially white light, a second means for separating the light from said second source into its spectrum, means supporting said second light separating means in a position for directing the said second mentioned spectrum upon said copy in inverse order to that of the first spectrum and superposed thereon, said first and second means for separating the light including elongated prisms, while said means for supporting the light separating means each includes means to adjust its prism angularly about its longitudinal axis and rectilinearly transversely of its axis, separate masking means intermediate each of said light separating means and said copy for selectively masking all but a selected band of the corresponding spectrum, and means for producing relative movement between said copy and said light separating means in a direction parallel with said surface while maintaining the said light separating means in predetermined spaced relationship whereby the copy is scanned by a continuous band of preselected colored light having substantially uniform characteristics throughout its width.

4. An apparatus for illuminating copy which is to be reproduced in a plurality of separate preselected colors comprising a first source of substantially white light, a first means for separating the light from said source into its spectrum, means supporting said first means in a position for directing the spectrum upon the copy to be reproduced, a second source of substantially white light, a second means for separating the light from said second source into its spectrum, means supporting said second light separating means in a position for directing the said second mentioned spectrum upon said copy in inverse order to that of the first spectrum and superposed thereon, said first and second light sources being elongated flash lamps, separate masking means intermediate each of said light separating means and said copy for selectively masking all but a selected band of the corresponding spectrum, means for producing relative movement between said copy and said light separating means in a direction parallel with said surface while maintaining said light separating means in predetermined spaced relationship whereby the copy is scanned by a continuous band of preselected colored light having substantially uniform characteristics throughout its width, and means to cause intermittent flashing of said flash lamps in timed relationship with the said relative movement.

5. An apparatus for illuminating copy to be photographed in a plurality of separate preselected colors comprising a pair of spaced elongated light sources each capable of producing substantially white light, a separate enclosure for each light source having an elongated opening, means to adjust the width of each opening, a separate elongated spectrum producing member supported adjacent each opening in a position to separate the light therefrom into its color components, a separate enclosure for each of said spectrum producing members having an elongated aperture positioned to permit the color separated light to pass therethrough and fall in superposed relationship upon the copy to be reproduced, separate means to adjust the width of said apertures to provide a single narrow band of light of a preselected color upon the surface of the copy to be reproduced and coextensive in length with one dimension of the copy but fractional in width compared to the other dimension of the copy, means to effect relative movement between the copy and the narrow band of colored light in the direction of said other dimension of the copy so that the entire copy is scanned by said band, and a separate means cooperating with each spectrum producing member to adjust the position of the same relative to the aperture of its enclosure.

References Cited in the file of this patent

UNITED STATES PATENTS

| 1,831,152 | Weisker | Nov. 10, 1931 |
| 1,927,693 | Weisker | Sept. 19, 1933 |
| 2,554,243 | Desirello | May 22, 1951 |

OTHER REFERENCES

| 409,287 | Great Britain | Apr. 23, 1934 |